J. GIELOW.
FAUCET.
APPLICATION FILED JULY 3, 1909.
955,641.
Patented Apr. 19, 1910.
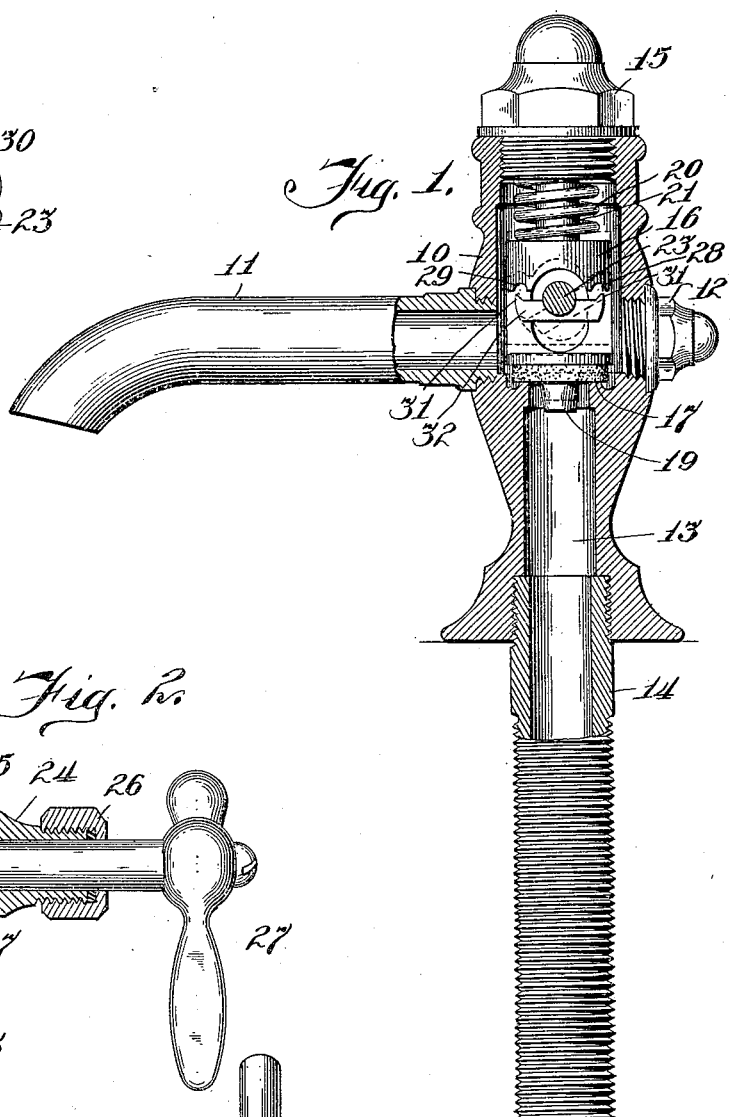
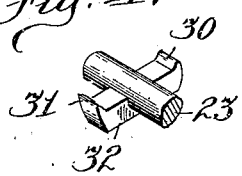
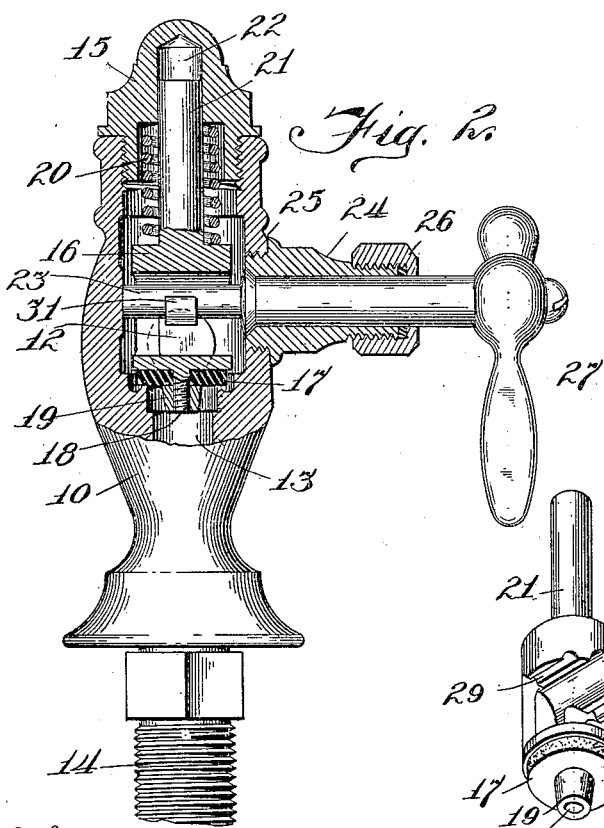
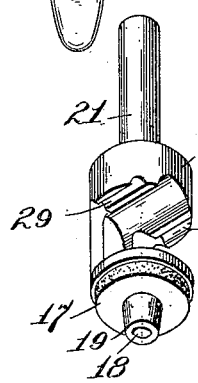
Witnesses
Milton Lenoir
E. M. Klatcher
Inventor,
John Gielow,
By Gillson & Gillson
Attorneys.

UNITED STATES PATENT OFFICE.

JOHN GIELOW, OF CONGRESS PARK, ILLINOIS, ASSIGNOR OF ONE-THIRD TO EMIL GIELOW, OF CHICAGO, ILLINOIS, ONE-THIRD TO MARIA GIELOW, OF CONGRESS PARK, ILLINOIS, AND ONE-THIRD TO WALTER H. PUSCHECK, OF CHICAGO, ILLINOIS.

FAUCET.

955,641.

Specification of Letters Patent.   Patented Apr. 19, 1910.

Application filed July 3, 1909.   Serial No. 505,837.

*To all whom it may concern:*

Be it known that I, JOHN GIELOW, a citizen of the United States, and resident of Congress Park, county of Cook, and State of Illinois, have invented certain new and useful Improvements in Faucets, of which the following is a specification, and which are illustrated in the accompanying drawings, forming a part thereof.

The invention relates to faucets especially adapted for use in drawing water, and to that type of faucet in which the valve is spring-seated and is controlled by a laterally-projecting spindle, the object of the invention being to provide means for opening the valve by a spindle which may be turned in either direction.

The invention consists of a structure such as is hereinafter described, and as illustrated in the accompanying drawings in which—

Figure 1 is a vertical section through the body of the cock of the faucet, on a plane transverse to the controlling spindle, some of the parts being shown in elevation; Fig. 2 is a similar view on a plane perpendicular to that of Fig. 1; Fig. 3 is a detail in perspective of the valve; and Fig. 4 is a detail in perspective of the inner portion of the controlling spindle and the valve-lifting block attached thereto.

The body of the faucet is shown at 10, and its delivery nozzle at 11. This nozzle is shown as secured to the body by means of a threaded stem, and the body is also provided at its opposite side with a threaded opening to which the nozzle may, if desired, be applied, this opening being closed by means of a threaded plug 12. If desired the nozzle and plug may be transposed in order that the faucet may deliver in the opposite direction.

The lower end of the body 10 is provided with a longitudinal duct 13 leading to its valve chamber, the body being counterbored at the outer end of this duct and threaded for attachment to a pipe 14. The valve chamber is located at the upper end of the duct 13, the nozzle apertures opening to it laterally and the valve chamber opening through the top of the body, its upper end being closed by means of a screw-cap 15. The valve body 16 is housed within the valve chamber, the valve proper 17 being a disk of soft material, such as rubber or leather, fitting upon the stem 18 depending from and preferably integral with the valve body, and carrying a nut 19 for securing the valve disk. The bottom of the valve chamber forms the seat for the valve, and the valve is normally held to this seat by means of a helical spring 20, coiled about a stem 21 projecting upwardly from the valve body, and sliding in a socket 22 in the cap 15, the spring reacting between the inner face of the cap and the upper face of the valve body.

The valve is controlled by means of a spindle 23 entering the body 10 laterally through a suitable opening, and being held in place by means of a threaded sleeve 24 bearing against an annular flange 25 on the spindle, the inner end of the spindle abutting against the opposite wall of the valve chamber. A suitable gland 26 is applied to the outer end of the sleeve 24 to prevent leakage, and the handle 27 is fitted to the outer end of the spindle 23.

The valve body 16 is apertured to accommodate the spindle 23, which passes entirely through it, and to provide shoulders 28, 29, for the engagement of lips 30, 31, of a lifting block 32 carried by and preferably integral with the spindle 23. These shoulders 30, 31, being upon opposite sides of the spindle, raise the valve in opposition to the spring 20, in succession, when the spindle is turned in opposite directions. The lips 30, 31, project upwardly and their edges are rounded. The shoulders 28, 29, are recessed to form curved bearings for the rounded edges of the lips so that there is a rolling and practically frictionless engagement. The lips 30, 31, are slightly removed from the shoulders in the normal position to enable the valve to be firmly seated by the action of the spring.

I claim as my invention—

1. In a faucet, in combination, a casing having induction and discharge ports, a valve within the chamber and seated over the induction port, a spindle entering the casing laterally and carrying a lifting block having lips engaging shoulders on the valve-body on opposite sides of the spindle, and a spring urging the valve to its seat.

2. In a faucet, in combination, a casing having induction and discharge ports, a valve within the casing and seated over the induction port and having a chambered body, a spindle entering the casing laterally and extending into the chamber of the valve body, a lifting block fixed to the spindle and having lips at opposite sides thereof engaging the wall of the chamber of the valve body, and a spring urging the valve to its seat.

3. In a faucet, in combination, a casing having induction and discharge ports, a valve within the casing and seated over the induction port and having a chambered body, a spindle entering the casing laterally and extending through the valve body and bearing against the wall of the casing, such spindle having an annular flange, a sleeve on the spindle and engaging its flange and in threaded engagement with the casing, a lifting block fixed to the spindle and having shoulders at opposite sides thereof engaging the wall of the chamber of the valve body, and a spring urging the valve to its seat.

JOHN GIELOW.

Witnesses:
E. M. KLATCHER,
CHARLES B. GILLSON.